May 28, 1946.   W. C. HEATH   2,401,243
ELECTRIC WELDING
Filed April 9, 1943   7 Sheets-Sheet 2

FIG. 2.

William C. Heath
INVENTOR.
BY
ATTORNEY.

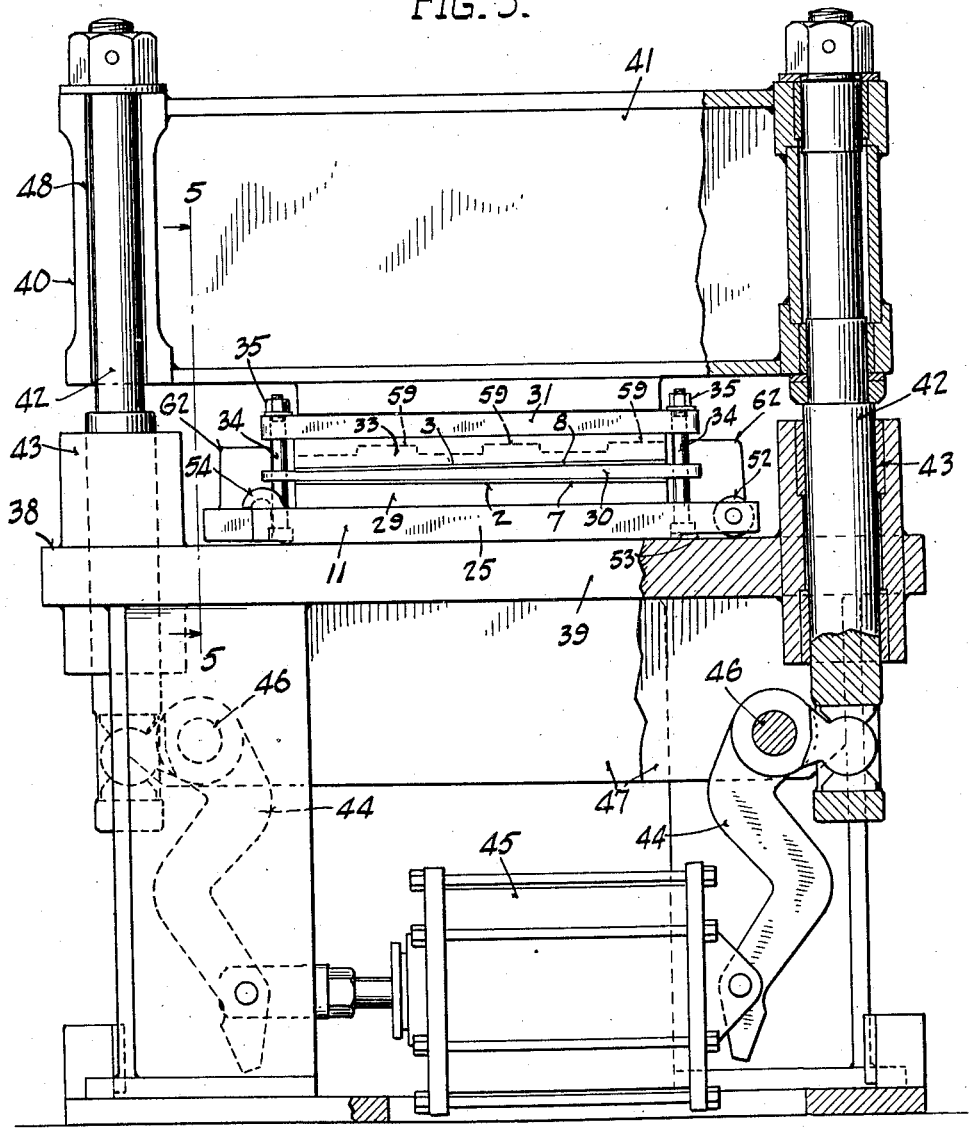

May 28, 1946.    W. C. HEATH    2,401,243
ELECTRIC WELDING
Filed April 9, 1943    7 Sheets-Sheet 4
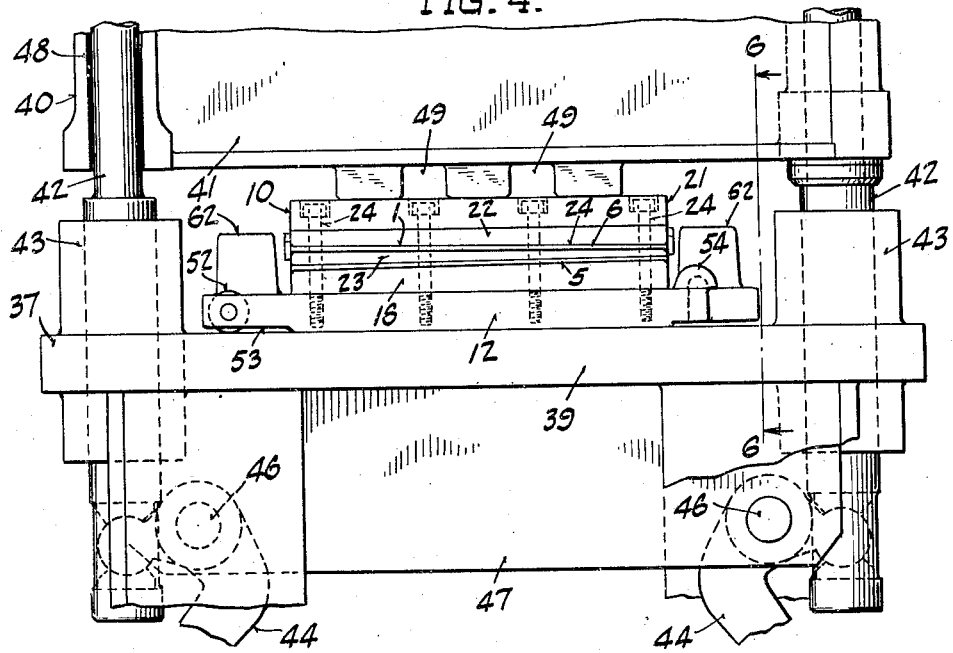
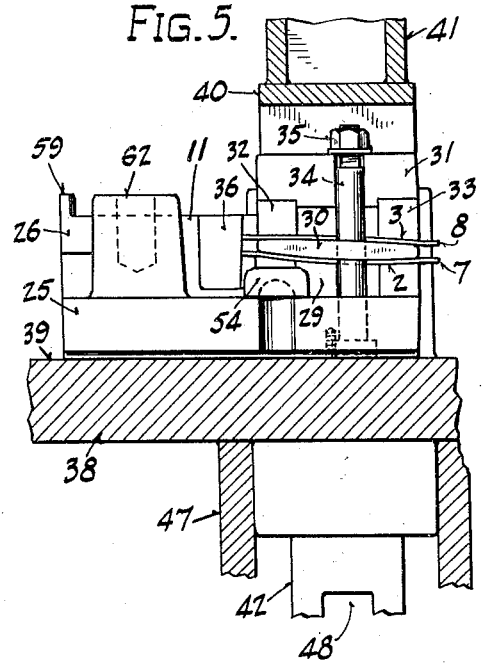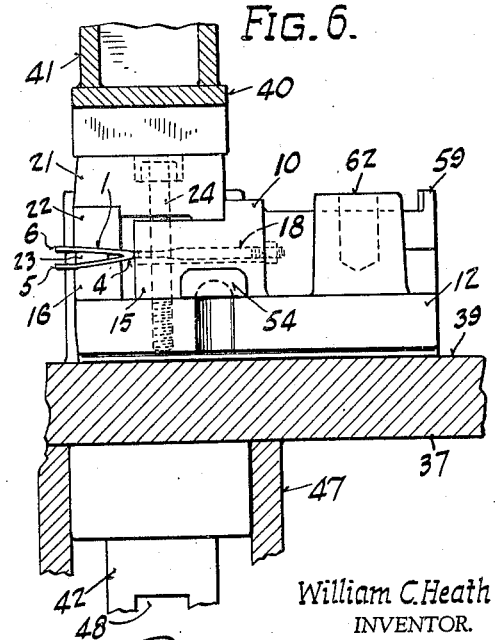
William C. Heath
INVENTOR.
BY *[signature]*
ATTORNEY.

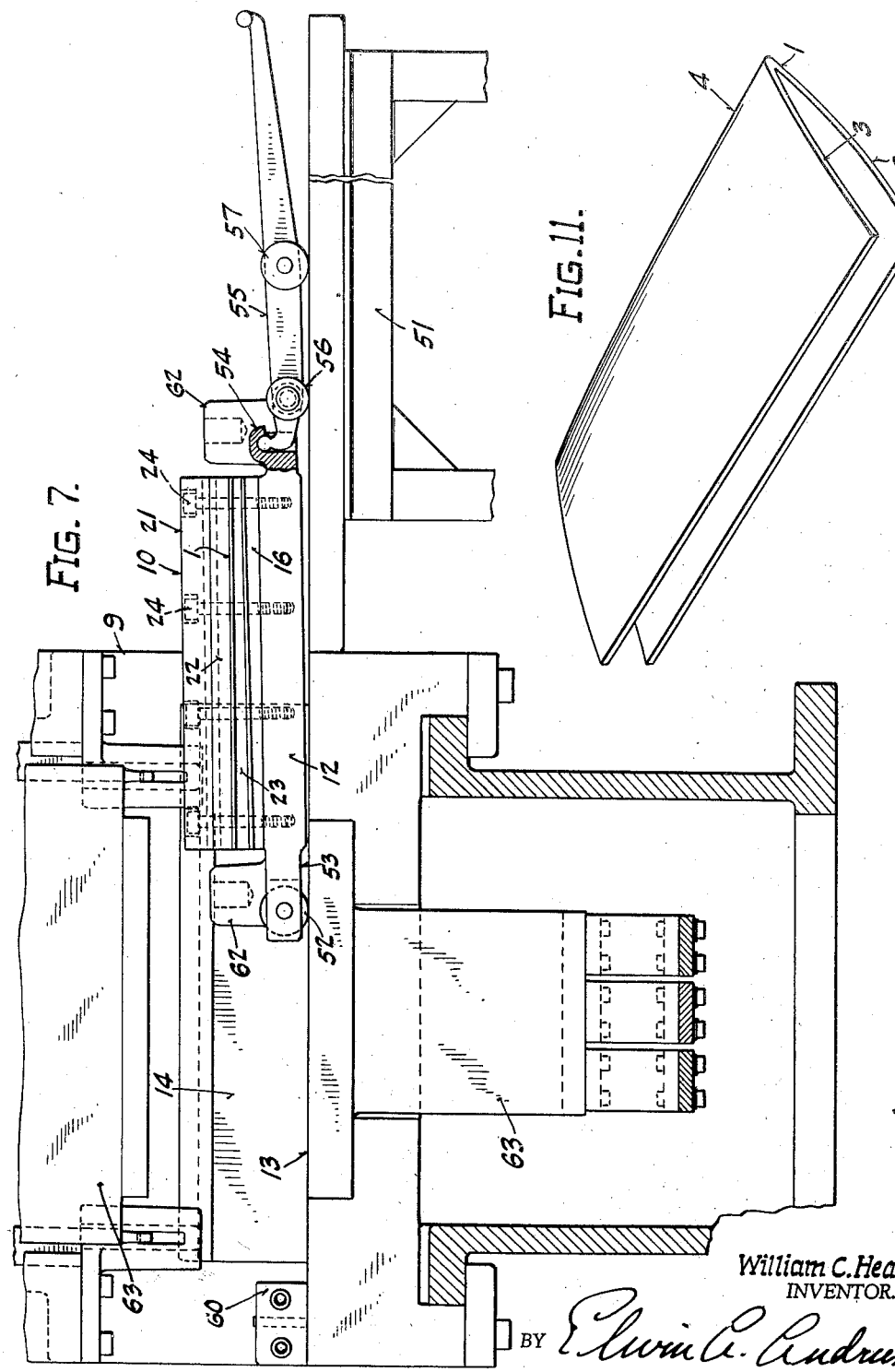

May 28, 1946.    W. C. HEATH    2,401,243
ELECTRIC WELDING
Filed April 9, 1943    7 Sheets-Sheet 6

William C. Heath
INVENTOR.
BY
ATTORNEY.

Patented May 28, 1946

2,401,243

UNITED STATES PATENT OFFICE 2,401,243

ELECTRIC WELDING

William C. Heath, Shorewood, Wis., assignor to A. O. Smith Corporation, Milwaukee, Wis., a corporation of New York Application April 9, 1943, Serial No. 482,381

16 Claims. (Cl. 219—10)

This invention relates to electric welding of seams as by resistance or flash butt welding.

The advantages of flash welding in mass production operations may not be fully realized where the setup time for welding prevents the rapid production of welds in the welding machine.

This is particularly true where a number of different types of pieces are to be welded in one machine and it is necessary to change the welding electrodes or dies to accommodate each type of piece. Frequent changes of the electrode often reduce the time of operation of a welding machine to a point where the cost is too great for the product.

Likewise, where a plurality of parts are to be welded at two or more seams simultaneously, the setting-up time for the parts may be too great to economically carry out in the welding machine itself. Particularly is this so where two or more parts are clamped with spacer members therebetween in one electrode of the machine and one or a similar number of complementary parts are clamped in the other electrode of the welding machine. In trying to clamp such parts in a welding machine it is often very difficult to obtain the accuracy of relative location of the parts necessary for good welding, and the time involved reduces the output of the machine.

The object of the invention is to eliminate these difficulties and to obtain greater production from welding machines.

In carrying out the invention the parts to be welded are clamped in cartridges or subassembly units outside of the machine and fed to the machine where two or more cartridges are clamped in the welding electrodes for welding, and the setup time in the machine is kept at a minimum. Where different sizes or types of articles are to be welded in the machine, separate electrode clamps are designed to correspond to each particular size or type of piece and to fit directly into the machine as cartridges without requiring a setup change in the machine. Likewise, where the shape of the parts at the edge to be welded requires special clamping to hold the parts, this clamping is done in a subassembly operation with separate electrode clamps which subsequently fit into the welding machine without delay. Where two or more seams are to be welded simultaneously in parallel, the several parts are first clamped in subassemblies and then positioned in the machine to present the edges of the piece or pieces on one side of the welding machine as a unit to the corresponding edges of the piece or pieces on the other side of the welding machine.

The accompanying drawings illustrate the application of the invention to the electric flash welding of longitudinal seams of aircraft propellers.

The views of the drawings are as follows:

Fig. 2 is a front elevation of the machine and preassembly stations;

Fig. 3 is a side elevation of an assembly table and press with parts in section and with a foil package therein;

Fig. 4 is a similar view of a part of the table and press with a trailing edge package therein;

Fig. 5 is a vertical section taken on line 5—5 of Fig. 3;

Fig. 6 is a vertical section taken on line 6—6 of Fig. 4;

Fig. 7 is a side elevation of a completed cartridge showing the manner of rolling it into the welding machine from the transfer table;

Fig. 11 is a perspective view of the welded parts after the cartridge electrode clamps have been removed and after removal of the flash.

Figure 1:
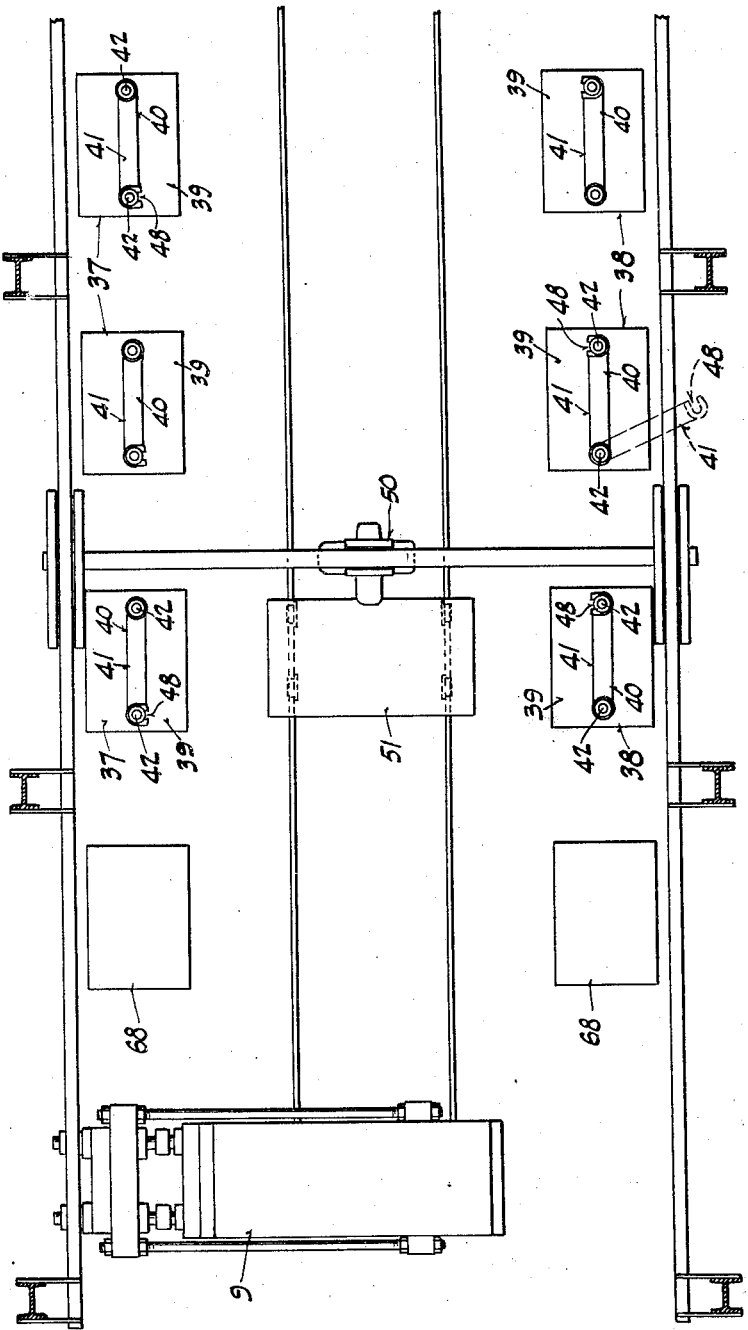
Figure 1 is a plan view of a welding machine with preassembly stations.
Figure 8:
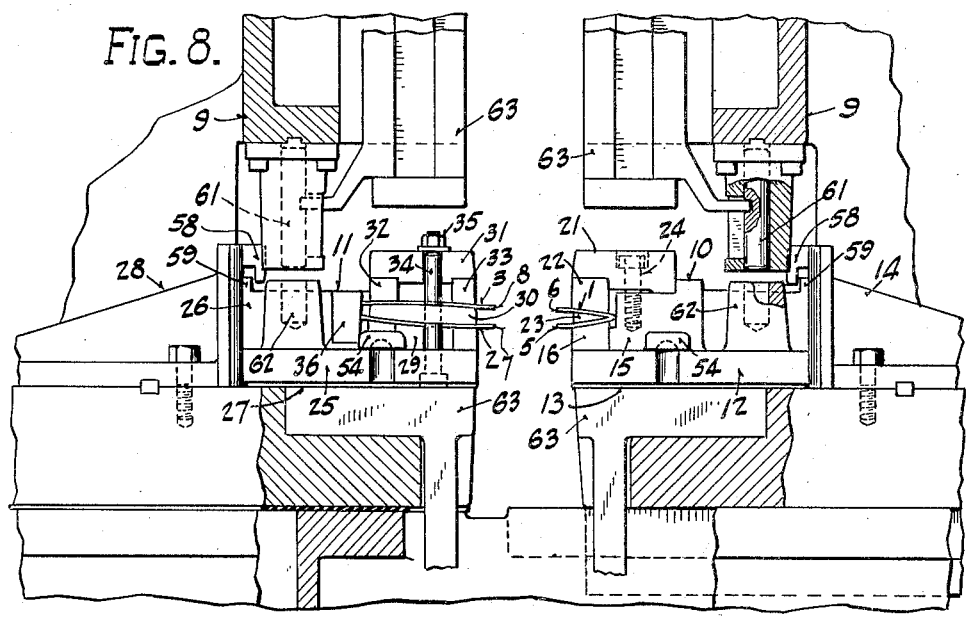
Fig. 8 is an end elevation of part of the welding machine with parts sectioned and showing the cartridges in place for welding.
Figure 9:
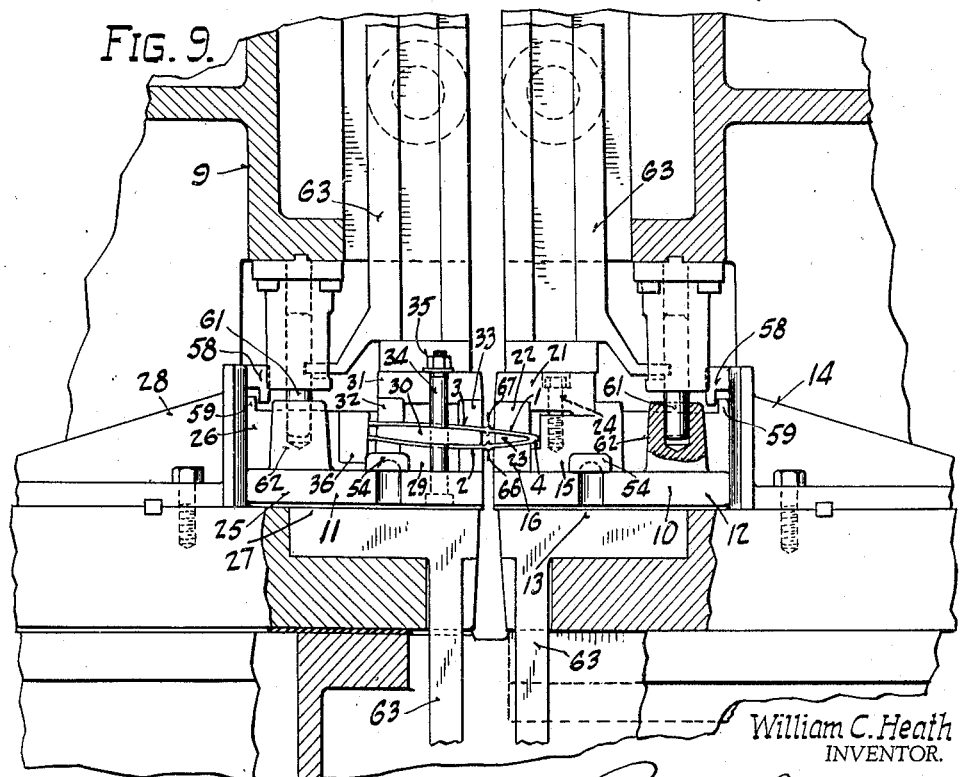
Fig. 9 is similar to Fig. 8 showing the parts finally welded together.
Figure 10:
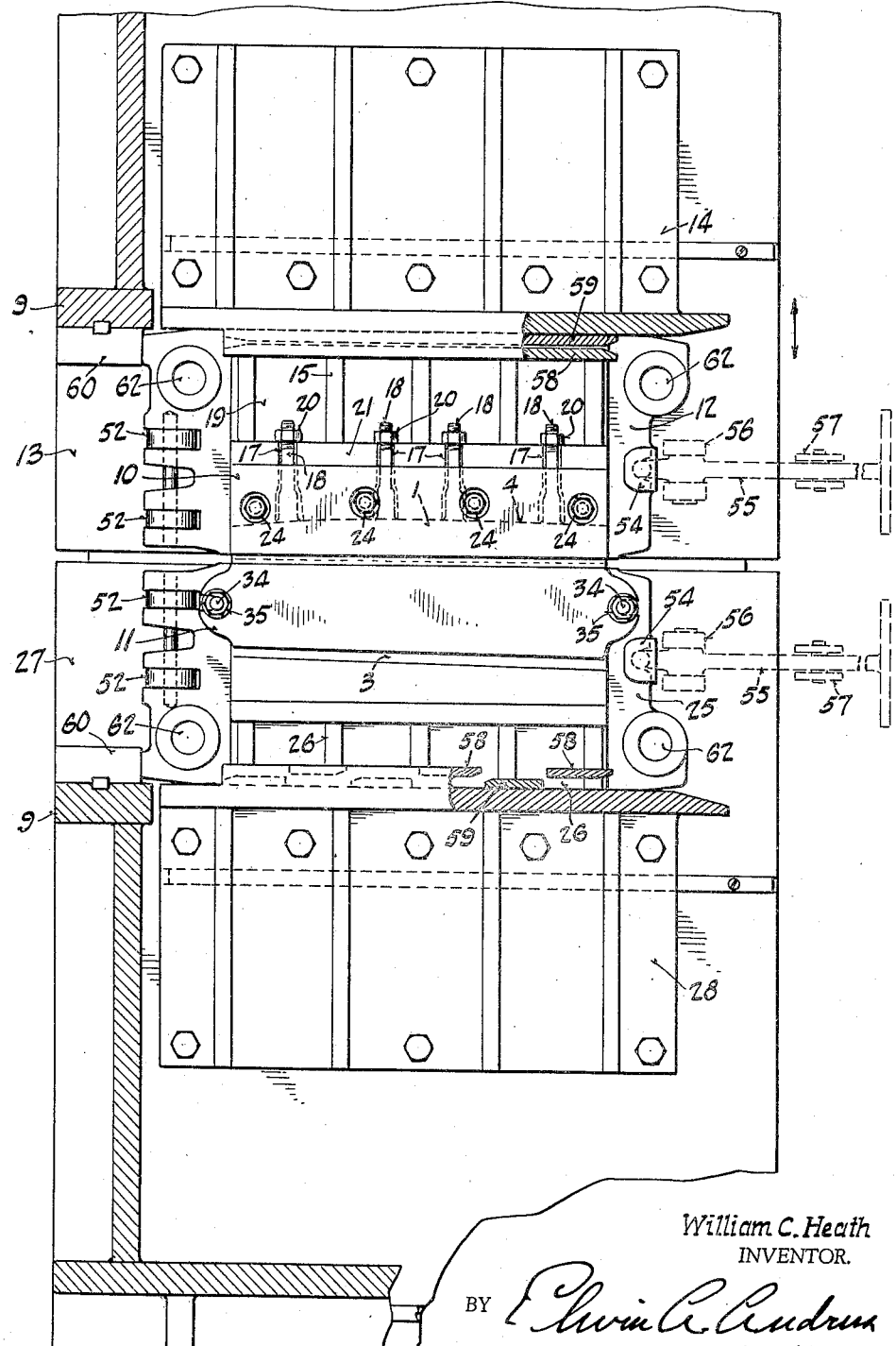
Fig. 10 is a top plan view of the cartridges in the welding machine with parts sectioned to show the guides.

The parts of the aircraft propeller being welded are the trailing edge member 1, the camber face plate 2 and the thrust face plate 3. These parts are constructed in the manner set forth in my copending application, Serial No. 480,682, filed March 26, 1943, for Electrically welded hollow steel propeller blade and method of making the same.

The member 1 comprises a V-shaped forging having its central apex portion extending longitudinally of the member to constitute the trailing edge 4 of the final propeller blade. The two edge portions 5 and 6 of the member 1 are constructed for electric flash welding to the corresponding edge portions 7 and 8 of foil plates 2 and 3, respectively. This flash welding of the edges 5 and 7 and of the edges 6 and 8 is done in one operation in the welding machine 9, the two seams being in parallel with one another.

If the several parts were set up in the welding machine 9 in accordance with regular flash welding practice, the machine would have a time cycle of operation several times that of the welding portion of its cycle. The present invention saves the time of setup and greatly increases the output of the welding machine by providing a subassembly of the parts which can be quickly introduced to the machine. The time cycle of operation of the machine is reduced to less than 25% of the former cycle and thereby more than four times the output of propellers can be obtained without increasing the number of expensive welding machines. The relatively inexpensive equipment necessary to provide this increased production results in a substantial saving in cost.

This is accomplished by providing stations outside the welding machine for assembling the several parts in a pair of packages for welding. The member 1 is assembled and clamped in one package 10 while the two plates 2 and 3 are assembled and clamped in the other package 11.

The package 10 comprises a base 12 having a flat horizontal bottom for resting upon the platen 13 of the welding machine 9, and a vertical rear edge for engaging the push or backing up member 14 of the machine to apply the welding pressure. A blank supporting upright 15 is cast integrally upon base 12 and has a front edge recess therein for receiving a work clamping member 16.

Downwardly extending transverse slots 17 in the upper surface of upright 15 are disposed to receive lugs 18 secured to the edge 4 of member 1 as set forth in my copending application, Serial No. 481,571, filed April 2, 1943, for Electric flash welding. The outer ends of lugs 18 are threaded and extend into larger openings 19 in the top of upright 15 and receive nuts 20 for tightening and holding member 1 in place.

A top clamping member 21 carries an upper work clamp 22 and has its rear edge abutting against a vertical shoulder in upright 15 to transmit the welding pressures. The member 1 constituting the work piece is thus clamped between members 16 and 22 which have their faces contoured to receive the piece and hold it in proper shape for welding. Wooden blocks 23 or blocks of relatively soft metal should be driven in between the upper and lower portions of member 1 to hold the edge portions 5 and 6 outwardly in place against the clamps 16 and 22. The package 10 is held together by means of a plurality of cap screws 24 passing downwardly through the clamping member 21 and threaded into the base 12.

Package 11 is constructed somewhat similar to package 10. Package 11 has a base 25 upon which is cast an upright 26 along its rear edge. The base 25 has a flat bottom for resting upon the platen 27 of the welding machine 9. The rear vertical edge of base 25 engages the push or backing up member 28 of the machine to apply the welding pressure.

A replaceable lower work clamp 29 rests on top of base 25 and is shaped on its upper surface to fit and support the camber plate 2. An intermediate spacer block 30 rests on plate 2 and in turn supports plate 3 in vertically spaced relation to plate 2, the upper and lower faces of block 30 being of a contour to substantially fit the shape of the plates 3 and 2, respectively.

The upper clamping member 31 carries two spaced longitudinally extending work clamp strips 32 and 33 for applying a substantial downward clamping pressure upon the assembly. The spacer block 30 and member 31 extend beyond the ends of the work and bolts 34 extend upwardly from base 25 through openings in the block 30 and member 31 to receive nuts 35 for securing the cartridge together with the work clamped therein in position for welding.

The package 11 holds the plates 2 and 3 with edges 7 and 8 extending freely from the package and in correct spaced position for alignment with the respective edges 5 and 6 of member 1. The rear edges of plates 2 and 3 extend beyond the clamping members to abut against the push block 36 which in turn engages upright 26 to transmit the welding backing up pressure to the plates.

The packages 10 and 11 are assembled separately in different preassembly stations 37 and 38, there being as many stations as are necessary to keep the welding machine busy. Each station comprises a table top 39 upon which the assembly is made up, and a press 40 for securing the parts under pressure at the time the cap screws 24 and bolts 34 are applied.

The press 40 may be of any suitable kind, that shown having a vertically movable cross head 41 supported on end vertical rods 42 reciprocating in bearings 43 secured in the table top 39. The lower ends of rods 42 are supported by the bell crank levers 44 operated by the double-acting fluid pressure cylinder 45, connecting the lower ends of the levers. The levers 44 are pivoted at 46 to cross beams 47 secured to the under side of the table top 39 and transmitting upward pressure thereto in counteraction to the downward pressure of cross head 41.

The cross head 41 is hinged to a rod 42 at one end, and has a lateral slot 48 for receiving the rod 42 at the other end, to provide for swinging of the cross head out of the way when the package parts are being assembled and when the package is being moved by an overhead crane.

The cross head 41 at the station for assembling the trailing edge package has openings 49 therein as shown in Fig. 4 to provide access to tighten the cap screws 24 intermediate the ends of the package.

After a package 10 or 11 is assembled on top 39 beneath cross head 41 the latter is moved downwardly by means of cylinder 45 to press the assembly together. Then the cap screws 24 or 35, as the case may be, are applied and tightened to secure the package. The cross head 41 is then raised and pivoted out of the way, and the package lifted by a crane 50 onto a transfer car 51 located between two stations 37 and 38. When a package 10 and a package 11 are loaded onto the transfer car 51 in relative position for welding, the car is moved to the front of the welding machine.

The packages are heavy, and in order to transfer them from car 51 to the platens 13 and 27 of the welding machine the base of each package is provided with wheel supports 52 at one end, normally spaced above the bottom of the base and the bottom of the base is slanted upwardly at this end, as at 53. The other end of the base of each package has an upwardly recessed shoulder 54 under which a lever tool 55 is hooked. The tool 55 has a fulcrum support on a pair of rollers 56 and the outer end of the tool likewise has rollers 57 for engaging the top of car 51 when the tool is in operation. The tool 55 is bent at its fulcrum so that when its outer end is manually pushed downwardly to horizontal position its other end raises the end of the package and tilts the latter sufficiently to cause the wheels 52 to engage the car 51. Then the package can be moved forwardly into the welding machine on the wheels 52 and rollers 56. For this purpose the top of car 51 should be at the same heighth as the top of platens 13 and 27.

The packages are guided into the welding machine by means of interlocking guide members 58 provided on the upper edges of push members 14 and 28 of the welding machine to interlock with guide members 59 on the respective uprights 15 and 26 of the packages. After rough location of the packages against stops 60 upon platens 13 and 27, respectively, the mechanically operated dowel pins 61 are lowered into upward dowel receiving bosses 62 at the rear corners of the packages. This doweling operation locates and indexes each package relative to its respective platen and push member of the welding machine.

Upon final positioning of the packages in the welding machine the transformer secondary terminals 63 are brought into pressure engagement with the upper and lower surfaces of the packages to transmit the welding current thereto. In the machine illustrated there are two transformers: one, 64, above the welding platens 13 and 27, and the other, 65, below the welding platens. The upper clamping member 21 of package 10 is engaged by one of the secondary terminals 63 of transformer 64, while the upper clamping member 31 of package 11 is engaged by the other secondary terminal 63 of transformer 64. Likewise, the bottom of base 12 of package 10 is engaged by one of the secondary terminals 63 of transformer 65, while the bottom of base 25 of package 11 is engaged by the other secondary terminal 63 of transformer 65.

In the welding operation, platen 27 and its package 11 and electrode terminals remain stationary, while platen 13 and its package 10 and electrode terminals move toward platen 27. In this manner the opposed edges 5 and 7, and 6 and 8, are brought into flashing contact and finally bumped together to produce the flash welded seams 66 and 67, respectively. During the flashing contact of the edges the welding current passes through the respective clamping members of packages 10 and 11 in reaching the work pieces from the terminals 63.

After the welding operation, platen 13 is withdrawn from platen 27 and the packages with their welded work pieces are withdrawn from the machine as a unit onto the transfer car 51 and thence to a disassembling station 68. In order to provide for separation of the platens 13 and 27, the interlocking guide members 58 and 59 on one side, preferably the side of the movable platen, are discontinuous and have side openings 69 corresponding to the opposing respective guide member so that they do not interlock in the final welding position.

The invention may have various embodiments within the scope of the accompanying claims.

I claim:

1. In the electric flash welding of parts difficult to assemble in the welding machine and requiring a set up time unreasonably long relative to the welding cycle, the conservation of the time of the welding machine for welding by assembling the opposed work parts externally of the welding machine in separate portable packages wherein the respective parts are clamped by electrode welding dies under welding contact pressure, transferring a plurality of such packages containing the opposing work parts to a flash welding machine with said packages disposed in relatively movable supports therefor and with the edges of the parts to be welded disposed in alignment for welding, applying the terminals of a welding current source to the corresponding packages, relatively moving the packages in the welding machine while applying the welding current thereto to effect flash welding of the aligned edges of the parts, removing said packages as a unit from the machine, and disassembling the packages to free the welding dies for use in successive welding operations and provide the welded parts for subsequent fabrication.

2. In the electric flash welding of parts difficult to assemble in the welding machine and requiring a set up time unreasonably long relative to the welding cycle, the conservation of the time of the welding machine for welding by assembling the opposed work parts externally of the welding machine in separate portable packages wherein the respective parts are clamped by electrode welding dies under welding contact pressure, transferring a plurality of such packages containing the opposing work parts to a flash welding machine with said packages disposed in relatively movable supports therefor and with the edges of the parts to be welded disposed in alignment for welding, applying the terminals of a welding current source to the corresponding packages, relatively moving the packages in the welding machine while applying the welding current thereto to effect flash welding of the aligned edges of the parts, removing said packages as a unit from the machine, disassembling the packages to free the welding dies for use in successive welding operations and provide the welded parts for subsequent fabrication, and carrying out continuous assembly operations upon successive packages to keep the welding machine occupied with welding operations most of the time, the successive sets of welding dies being cooled during the portion of the time cycle when they are out of the machine.

3. In electric flash welding two or more seams in parallel simultaneously, the securing of the adjacent edge portions of the work, to be welded to corresponding adjacent edge portions, in a preassembled portable package with welding dies fitting said work for clamping the same in position and conducting welding current thereto, securing the corresponding opposing edge portions, to be welded to said first named adjacent edge portions, in a similar separate preassembled portable package, placing said packages in a welding machine, applying electrode contacts to the packages with one package receiving current from one terminal of a welding current source and the other package receiving current from the opposite terminal of the current source, establishing relative movement between said packages toward one another to establish a flashing of the metal at the opposed edges until the same are substantially uniformly heated, then pressing the opposed edges together under substantial pressure to complete the weld, removing the welded packages from the machine, and finally removing the welding dies from the parts.

4. In the electric butt welding of a product requiring the use of different welding dies for different sizes and shapes of the product, avoiding the loss of use of the welding machine due to changing of the welding dies, by constructing the machine with electric terminals and pressure applying members adapted to fit and clamp against corresponding cartridges of standard size and shape, pre-assembling successive cartridges each containing a separate work piece of the desired size and shape clamped by complementary welding dies presenting a standard external size and shape for fitting into said welding machine irrespective of the size and shape of the respective work piece, and successively transferring to the machine sets of cartridges and butt welding the same therein.

5. In the electric butt welding of a product requiring the use of different welding dies for different sizes and shapes of the product, avoiding the loss of use of the welding machine due to changing of the welding dies, by constructing the machine with electric terminals and pressure applying members adapted to fit and clamp against corresponding cartridges of standard size and shape, providing a plurality of sets of portable welding dies to fit the work pieces for each size and shape of product and adapted to be assembled externally of the machine into interchangeable sets of cartridges irrespective of the size and shape of the work pieces, pre-assembling successive cartridges each containing a separate work piece of the desired size and shape clamped by complementary welding dies presenting a standard external size and shape for fitting into said welding machine irrespective of the size and shape of the respective work piece, and successively transferring to the machine sets of cartridges and butt welding the same therein.

6. In electric flash welding, the steps of assembling a part to be welded with a complemental portable section of the welding dies exteriorly of a welding machine, clamping the assembly together under pressure, securing the assembly with the part in pressure engagement with said section of the welding electrode dies, transferring the assembly to a flash welding machine with an edge of the work piece exposed for welding, connecting the welding dies to a terminal of a source of welding current, and flash welding said exposed edge of the work piece to an opposing edge of a corresponding work piece.

7. In electric flash welding, the securing of one work piece to be welded in a pre-assembled portable package with welding dies fitting the piece for clamping the same in position and conducting welding current thereto, securing the corresponding opposed work piece in a similar separate pre-assembled portable package, placing said packages in a welding machine with the edges spaced and in alignment for welding, applying electrode contacts to the dies of the packages with one package receiving current from one terminal of a welding current source and the other package receiving current from the opposite terminal of the current source, establishing relative movement between said packages toward one another to establish a flashing of the metal at the opposed edges until the same are substantially uniformly heated, then pressing the opposed edges together under substantial pressure to complete the weld, removing the welded packages from the machine, and finally removing the welding dies from the welded parts.

8. In electric flash welding, the method of obtaining adequate and uniform contact pressures between an electrode and a work piece independently of the application of welding pressure and without wear on the electrode, comprising the steps of assembling a part to be welded with a complemental portable section of the welding electrode in a press, operating the press to clamp the assembly together, securing the assembly in clamped relation as a package, removing the package from the press and conveying the same to a welding machine, welding the part secured in said package to a part exterior thereto, removing said package and welded parts from the welding machine, and disassembling the package to remove the welding electrode therefrom.

9. In electric flash welding, the assembling of the parts to be welded in separate portable packages of welding dies each conforming to the shape of the respective part and leaving the edge portion to be welded and also a rear portion of the part freely exposed, clamping the parts of each package together in a direction substantially perpendicular to the exposed welding edge and to the direction of the welding pressure to be applied thereto, transferring the packages to a flash welding machine having movable electrodes adapted to contact the corresponding welding dies thereof and relatively movable control members adapted to engage the exposed rear portions of the respective parts to apply the welding pressure thereto in a direction substantially at right angles to the clamping pressure of the welding dies, and flash welding said parts together in said machine.

10. In electric flash welding, the clamping of the respective work pieces in separate pre-assembled portable electrode die packages with the edges to be welded exposed, transferring said packages to a flash welding machine with the exposed edges in alignment for welding, applying electrode terminals to the electrode dies to supply welding current to the work pieces and across the opposed edges thereof, relatively moving the packages to establish and maintain a flashing of the meeting edges of the work pieces, and finally pressing said packages relatively toward one another to abut the edges of the work pieces under a welding pressure without disturbing the pressure contact between the work pieces and the welding dies.

11. In electric flash welding, the securing of one work piece to be welded in a preassembled portable package with welding dies fitting the piece for clamping the same in position and conducting welding current thereto, securing the corresponding opposed work piece in a similar separate pre-assembled portable package, placing said packages in a welding machine with the edges spaced and in alignment for welding, doweling said packages in place, applying electrode contacts to the dies of the packages with one package receiving current from one terminal of a welding current source and the other package receiving current from the opposite terminal of the current source, establishing relative movement between said packages toward one another to establish a flashing of the metal at the opposed edges until the same are substantially uniformly heated, then pressing the opposed edges together under substantial pressure to complete the weld, removing the welded packages from the machine, and finally removing the welding dies from the welded parts.

12. In electric flash welding, the clamping of the respective work pieces in separate pre-assembled portable electrode die packages with the edges to be welded exposed, transferring said packages to a flash welding machine and doweling said packages in place with the exposed edges in alignment for welding, applying electrode terminals to the electrode dies to supply welding current to the work pieces and across the opposed edges thereof, relatively moving the packages to establish and maintain a flashing of the meeting edges of the work pieces, and finally pressing said packages relatively toward one another to abut the edges of the work pieces under a welding pressure.

13. In combination, an electric flash welding machine having means to supply welding current to the work pieces to be welded, to relatively move the work pieces during flashing and to apply welding pressure thereto, a pair of portable package units each comprising electrode die members fitting a work piece to be welded to a corresponding work piece of the other and independent clamping means for securing the work piece between the die members of the package unit, said package units being of a predetermined size and shape for fitting into said welding machine and being adapted to be preassembled externally of the machine and to be readily inserted and removed to provide for rapid loading and unloading of the machine in a short time cycle, and means to separately support said package units in the machine in engagement with said current supplying and pressure applying means and with their corresponding work pieces in opposed position for flash welding.

14. In combination, an electric flash welding machine having means to supply welding current to the work pieces to be welded, to relatively move the work pieces during flashing and to apply welding pressure thereto, a pair of portable package units each comprising electrode die members fitting a work piece to be welded to a corresponding work piece of the other and independent clamping means for securing the work piece between the die members of the package unit, said package units being of a predetermined size and shape for fitting into said welding machine and being adapted to be preassembled externally of the machine and to be readily inserted and removed to provide for rapid loading and unloading of the machine in a short time cycle, and means to separately support and clamp said package units in the machine in engagement with said current supplying and pressure applying means and with their corresponding work pieces in opposed position for flash welding, said separate supporting and clamping means being relatively movable to provide for relative movement of the package units during flashing.

15. In combination, an electric flash welding machine having means to supply welding current to the work pieces to be welded, to relatively move the work pieces during flashing and to apply welding pressure thereto, a pair of portable package units each comprising electrode die members fitting a work piece to be welded to a corresponding work piece of the other and independent clamping means for securing the work piece between the die members of the package unit, said package units being of a predetermined size and shape for fitting into said welding machine and being adapted to be preassembled externally of the machine and to be readily inserted and removed to provide for rapid loading and unloading of the machine in a short time cycle, means to separately support and clamp said package units in the machine in engagement with said current supplying and pressure applying means and with their corresponding work pieces in opposed position for flash welding, and means to interlock said portable units on their respective supports to accurately position the same for welding, said separate supporting and clamping means being relatively movable to provide for relative movement of the package units during flashing.

16. In combination, an electric flash welding machine having means to supply welding current to the work pieces to be welded, to relatively move the work pieces during flashing and to apply welding pressure thereto, a plurality of sets of electrode die members each set constituting a pair of portable package units with independent means for clamping a separate work piece in each unit between electrode die members fitting the respective work pieces, said sets of package units being of a standard external size and shape for fitting into said welding machine irrespective of the size and shape of the work pieces and being adapted to be preassembled externally of the machine and to be readily inserted and removed in succession to provide for rapid loading and unloading of the machine in a short time cycle, and means to separately support said package units of each given set in the machine in engagement with said current supplying and pressure applying means and with their corresponding work pieces in opposed position for flash welding.

WILLIAM C. HEATH.